United States Patent [19]

Thompson

[11] Patent Number: 4,573,433

[45] Date of Patent: Mar. 4, 1986

[54] SIDE ACTIVATED ANIMAL WATERING VALVE

[76] Inventor: Earl C. Thompson, 448 First St., Hewitt, Tex. 76632

[21] Appl. No.: 637,612

[22] Filed: Aug. 3, 1984

[51] Int. Cl.⁴ ............................................... A01K 7/06
[52] U.S. Cl. ..................................... 119/72.5; 119/75
[58] Field of Search .................................. 119/72.5, 75

[56] References Cited

U.S. PATENT DOCUMENTS 3,698,431  10/1972  Thompson .................... 119/72.5

FOREIGN PATENT DOCUMENTS 2548661  5/1976  Fed. Rep. of Germany ..... 119/72.5
917815  4/1982  U.S.S.R. ................................ 119/72.5

Primary Examiner—Hugh R. Chamblee
Attorney, Agent, or Firm—Peter J. Murphy

[57] ABSTRACT

This animal watering valve is designed to enable the animal to obtain its own water within its mouth, by biting on it. Primarily, the valve includes a main body which is threaded into a water source pipe, and the main body includes an activating shaft or stem in its bore, which is normally seated by a coil spring. It further includes a rivet which acts as a trigger for urging the shaft or stem angularly off of its seat, to enable water to flow into the mouth of the animal.

1 Claim, 5 Drawing Figures

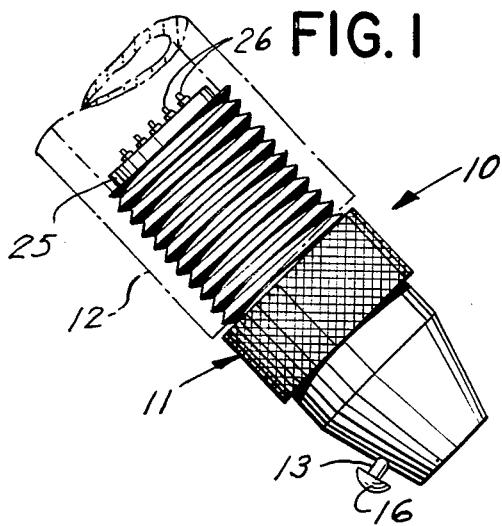
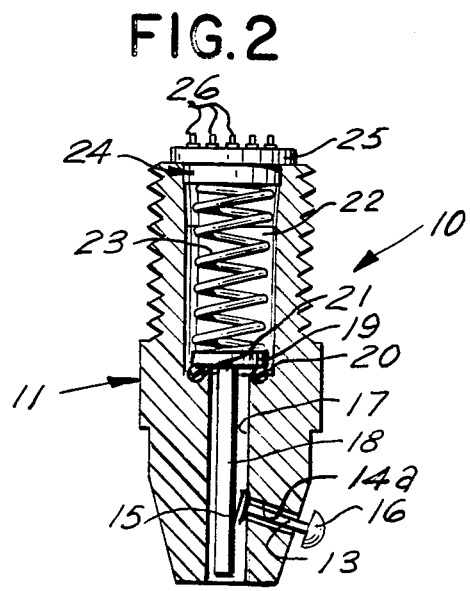
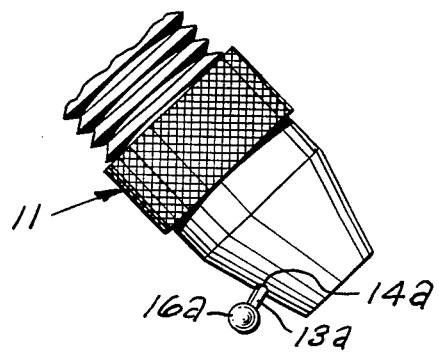
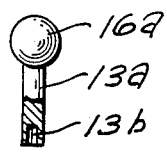
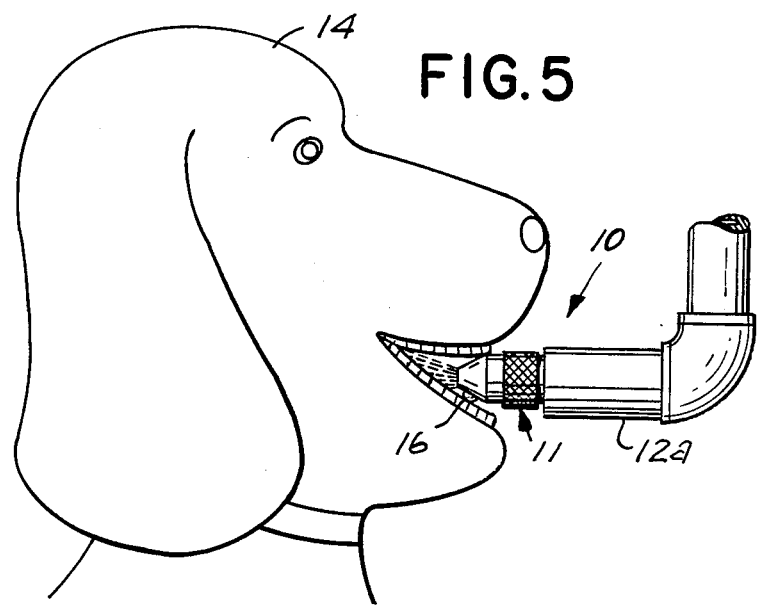

SIDE ACTIVATED ANIMAL WATERING VALVE

This invention relates to water valves, and more particularly to a side activated animal watering valve.

The principal object of this invention is to provide a side activated animal watering valve which will be so designed, as to be activated by the animal biting upon the nozzle portion, to open the valve, and enable water to enter its mouth.

Another object of this invention is to provide a side activated animal watering valve, which will be of such design, as to reduce water waste substantially and reduce the chance of the animal becoming infected with disease.

Another object of this invention is to provide a side activated animal watering valve, which will be of such design, as to induce the animal to take the valve in its mouth to obtain a drink of water, after just a little training, and the valve will include side leverage action, to enable the animal to obtain the water much easier.

A further object of this invention is to provide a side activated watering valve, which will include rivet means on the bottom, which will be employed as a trigger for the animal to receive its own water, and its design will be such, as to eliminate the chance of the animal leaning or lying on the valve, and wasting water, and the water runs over the rivet, thus keeping it clean of feed, enabling it always to operate freely.

Other objects are to provide a side activated animal watering valve which is simple in design, inexpensive to manufacture, rugged in construction, easy to use, and efficient in operation.

These, and other objects, will be readily evident, upon a study of the following specification, and the accompanying drawing, wherein:

FIG. 1 is a side elevational view of the present invention, showing the water pipe fragmentary and in phantom lines;

FIG. 2 is a vertical cross-sectional view of FIG. 1, shown in closed condition;

FIG. 3 is a fragmentary side elevational view of a modified form of the invention;

FIG. 4 is a vertical side elevational view of the trigger element of FIG. 3, shown enlarged, partly broken away, and removed from FIG. 3, and FIG. 5 is a side elevational view of the valve and pipe combination, shown on a horizontal plane and in operation.

Accordingly, a water valve 10 is shown to include a cylindrical stainless steel main body 11, which is externally threaded at its upper extremity, so as to thread into water pipe 12, which is coupled to a water source (not shown). Main body 11 includes a knurled outer periphery below the threaded area, so as to enable main body 11 to be threaded easily into pipe 12, and in this instance, pipe 12 is positioned at a forty-five degree angle to assist most animals in drinking therefrom. The lower extremity of main body 11 is of truncated conical shape, and includes a rivet 13, which serves as trigger means to be bitten on by the animal 14, to activate valve 10 to receive water in its mouth, when desired, which hereinafter will be described. Rivet 13 is freely received within an angularly disposed opening 14a through the conical portion of main body 11, and is provided with a flat head 15 on one end, and a button head 16 on its opposite end, which is on the exterior of main body 11. The flat head 15 is disposed within the bore 17 in the lower extremity of main body 11, for trigger engagement with the outer periphery of activator shaft 18, having a head 19 integrally attached thereto. Shaft 18 is freely received within bore 17, and extends almost its entire length. The head 19 of shaft 18 seats upon a rubber "O"-ring 20, which seats in a annular groove 21 in the bottom of the upper bore portion 22 of main body 11, in which a coil spring 23 is received. Coil spring 23 engages with head 19 of activator shaft 18 at one end, and the opposite end of spring 23 engages with a water flow control member 24, having a flange 25, and a plurality of orifice projections 26. The flange 25 seats on the upper end of main body 11, and water flows through the orifices of control member 24, which are not shown, but common in the art.

In operation, water is continuously within the upper bore portion 22 of main body 11, when the pipe 12 has been turned on, and when a pet animal 14 desires to have a drink of water, it places its mouth on valve 10 and bites lightly on the rivet 13. When the above-mentioned occurs, rivet 13 acts as a trigger and bears against the outer periphery of shaft 18, which is urged aside and lifts its head 19 from its seated position against spring 23 pressure, and causes water to flow from the bore 17 into the animal's mouth. When the animal 14 releases pressure on rivet 13, the shaft 18 returns to its normal position, which causes its head 19 to seat again upon "O"-ring by spring 23 pressure, which cuts off the water flow from valve 10.

Looking now at FIGS. 3 and 4 of the drawing, main body 11 is modified to employ a rivet 13a, which includes a ball-shaped head 16a, for making it easier on the mouth of the animal 14 when it is drinking. Rivet 13a also includes an opening 13b in its opposite end, for flaring it.

In operation, the function of rivet 13a is similar to that heretofore described of rivet 13.

Looking now at FIG. 5 of the drawing, valve 10 is shown to be employed in a pipe 12a, which is horizontal, rather than being at an angle, which enables pets of mixed sizes all to drink from valve 10.

In use, valve 10, in the horizontal condition, functions in the same manner as was heretofore described, when it was angularly mounted.

It shall be noted, that rivet 13 is designed for bottom placement, so as to cause it to fall away from shaft or stem 18 when valve 10 is not activated, and the opening 14a may be at right angles to the bore 17 of main body 11, enabling the flat head 15 of rivet 13 to bear directly against shaft or stem 18, causing less wear on 15 and 18, and also enabling rivet 13 to fall away more easily from contact with 18.

It shall also be noted, that the large ball shaped head 16a of modified rivet 13a, produces greater weight which helps rivet 13a to fall away more easily from shaft or stem 18, letting valve 10 close.

While various changes may be made in the detail construction, it is understood that such changes will be within the spirit and scope of the present invention, as is defined by the appended claims.

What is claimed is:

1. A side activated animal watering valve, comprising, in combination, a cylindrical main body, means on one end of said main body for attachment to a water supply source, an opposite end of said main body being conically tapered, a wide first central opening in said one end communicating with a narrower second central opening in said tapered end, a shoulder between said openings, a rubber "O"-ring rested against said shoulder, a shaft having an enlarged head at one end being inserted inside said main body, said shaft extending inside said second opening and said head resting against said "O"-ring, said shaft being thinner than said second opening to permit sidewardly tilting, a compression coil spring retained in said first opening bearing at one end against said stem head, and a transverse opening between an outer side of said tapered end and said second opening, and a rivet being slidable in said transverse opening, a button head on the outer end of said rivet, and a flat head on the inner end of said rivet, said flat head being configured larger than said transverse opening to retain said rivet in said transverse opening and being configured to selectively abut said shaft to effect the tilting thereof, said transverse opening being diagonally inclined respective to a longitudinal central axis of said cylindrical main body, and being generally perpendicular to said outer side of said tapered end, whereby when the watering valve is in an operative position the rivet tends to fall away from contact with said shaft.

* * * * *